Patented Apr. 14, 1942

2,279,879

UNITED STATES PATENT OFFICE 2,279,879

DETOXICANT AND METHOD OF PRODUCING SAME

Margaret Crosse, Los Angeles, Calif.

No Drawing. Application March 14, 1938, Serial No. 195,817

6 Claims. (Cl. 167—24)

This invention relates to an insecticide which is composed of highly toxic mineral poisons, which are detoxicated as far as animal life is concerned.

Heretofore, various materials have been used as insecticides and fungicides for the treatment of different fruits and vegetables. Certain of these insecticides contain metallic poisons so that they should be removed from fruit or vegetables before being consumed by human beings. Considerable difficulty has been experienced in the past in properly removing these insecticides and fungicides from fruit and vegetables before the same are to be consumed.

The present invention is predicated on the discovery that by combining or mixing an insecticide or fungicide which contains a mineral poison (lead arsenate or other metallic poison) with a certain colloidal cellulose material, the said insecticide or fungicide as applied to fruit or vegetables is rendered non-toxic and non-poisonous to human consumption. It has also been found that when the insecticide or fungicide containing a metallic poison is mixed with a special colloidal cellulose material it adheres firmly to the plant holding the insecticide or fungicide material so that it is practically unaffected by air or light, and will not be washed off by rain. The material, therefore, does not lose its effectiveness for a considerable period of time.

An object of this invention is to produce an insect spray which is non-toxic to animal life and still contains a dose of a mineral poison lethal to insects, larvae and fungi only.

Another object is to produce an insect spray which is non-toxic to the plant growth and fruit upon which it is placed.

Another object of this invention is to produce a lead arsenate spray, for preventing codling moths, which is non-toxic.

Another object of this invention is to produce a spray which will cling to the plant growth and fruit without the addition of oil or other hydrocarbons now necessary in the ordinary aqueous lead arsenate sprays.

Another object of this invention is to produce an insecticide which is readily removable from the fruit without the use of hot water and acid.

This invention provides for an insecticide or fungicide containing an average lethal dose of a mineral poison rendered non-toxic to human beings by being mixed with a particular colloidal cellulose to be more fully described hereinafter. This insecticide or fungicide is non-toxic to human beings, animal life, plant growth, or fruit. It can be completely removed from the fruit as it is soluble in water at a temperature of about 98.6° F. This temperature is sufficiently low to prevent wilting and decrisping of the fruit. The insecticide or fungicide of this invention also adheres to the plant growth and fruit because of its peculiar properties, and thus only new growth must be sprayed.

In producing the insecticide or fungicide of my invention the colloidal cellulose is mixed with a mineral poison, such as lead arsenate.

This colloidal cellulose is obtained from the seed of Caesalpineae or Cassiaceae, a tree of the senna family of the genus Ceratonia siliqua, of which there is only a single species of this genus. It appears that plants from four widely separated, recognized families and from six distinct genera, and at least a dozen different species, have been lumped together under a group of common names that are assumed to be equivalent. These names vary in different localities. The Caesalpineae, Cassiaceae, is a tree or bush which produces pods containing small very hard dark brown seeds or kernels. It is from these seeds that the special colloidal cellulose is produced which has the unique properties of rendering metallic poisons non-toxic to animal life; of rendering insecticide sprays containing such poisons, sufficiently adhesive to be weather resistant and protective to plant life, and of being easily soluble in water at a temperature of not more than 100° Fahrenheit; thus eliminating the serious problem of poisonous residues of cumulative poisons until now impossible to entirely remove from certain fruits.

The chemical analysis of the cellulose composition extracted from true carob seeds, properly named Caesalpineae, is as follows:

| | Per cent |
|---|---|
| Carbon | 43.51 |
| Hydrogen | 6.25 |
| Oxygen | 48.38 |
| Nitrogen | 0.39 |
| Ash | 1.49 |

Also

| | |
|---|---|
| Galacten | 29.18 |
| Mannan | 58.42 |
| Pentosans | 2.75 |
| Albuminoids | 5.29 |
| Cellular tissue | 3.64 |
| Mineral matter | 0.82 |
| Laevulan | Trace |

The ability of the above composition in colloidal form, to neutralize metallic poisons may lie in what is known as the "disperse system," a characteristic property of which is the power possessed by the surfaces between the separated particles, "disperse phase" and the void filling substance, "dispersing medium" or colloid, to condense upon themselves large quantities of solutes from liquid phases. This condensation is called "adsorption." Example: the amount adsorbed X, on the surface M, is given by expression $$\frac{X}{M} = KC\frac{1}{N}$$

where C is the concentration of the substance adsorbed, while K, and N are constants, N being greater than unity, seldom less than 2 or more than 20. Adsorption at low concentration is relatively far greater than at high, and this can be used to remove small amounts of impurities from solutions as in water purifying, sugar refining, decolorizing oils, etc. The adsorbing agent may be brought in contact with the liquid by admixture or by use of a countercurrent principle, the solid being held in a suitable container through which the liquid passes, thus forming an adsorption filter. Adsorption is generally greater the lower the temperature and the higher the molecular weight and complexity of the substance adsorbed. The molecular weight of metallic poisons, i. e., lead arsenate, etc., is high. Certain materials such as colloids and cellulose have high adsorptive power and these are often very specific in the substances they adsorb. The particular colloid in discussion has an especially high adsorptive power and these are often very specific in the substances they adsorb. The particular colloid in discussion has an especially high adsorptive power for metallic poisons.

Many important solid colloids, (cellulose, hair, wool, silk), are natural products, any chemical treatment of which causes disintegration of the aggregate to a greater or less extent, with results on the physical properties. An example is: concentrated alkalies form alteration products with vegetable fibre, (cellulose). A study of the use of this material in the technique of textile manufactures will illustrate the point. The admixture of metallic toxins in water solution plus the powdered cellulose from Caesalpineae seeds may produce some alteration product which, together with the faculty of adsorption, causes neutralization of the toxins in the metals.

These seeds are made into a dry powder by grinding, chemically treating, and dehydrating. The dry powder so derived is then cooked into a stiff jelly. This jelly is sieved to remove any fibrous, woody, or cellular extraneous material. The jelly is then dehydrated to form a dry powder.

The cellulose may be mixed with the mineral poison to form either a powdered insecticide or fungicide or may be mixed with water and mineral poison to form a spray solution. For example, six pounds of the above described powdered cellulose are sprinkled into 1000 gallons of cold water and the mixture continuously stirred during the addition of the cellulose. When all the powdered cellulose is in the water, the mixture is heated until thickened to the consistency of thin lubricating oil. A solution of 1000 gallons of water and 10 pounds of lead arsenate is made and then stirred into the cellulose mixture. This completes the insect spray and it may then be used.

Other mineral poisons may likewise be used, such as copper sulphate, copper arsenite, carbolic acid, caustic soda, arseniate of soda, and iron sulphate.

The following table shows the proportions in which these substances should be mixed. In some of them, such as caustic soda, it is necessary to add certain substances to the colloidal cellulose:

| | | | |
|---|---|---|---|
| Water | 500 gallons | 500 gallons | |
| Powdered Caesalpiniaceous seed | 3 pounds | — | |
| Copper sulphate | — | 40 pounds | |
| Water | 1000 gallons | 1000 | |
| Powdered Caesalpiniaceous seed | 6 pounds | — | |
| Copper arsenite | — | 2 | |
| Water | 1000 gallons | 1000 | |
| Powdered Caesalpiniaceous seed | 6 pounds | — | |
| Carbolic acid | — | 10 | |
| Caustic soda | — | 8 | |
| Water | 1000 gallons | 200 | 800 gallons |
| Powdered Caesalpiniaceous seed | 6 pounds | — | |
| Arseniate of soda | — | 6 | |
| Molasses | — | — | 200 gallons |
| Water | 1000 gallons | 500 | |
| Powdered Caesalpiniaceous seed | 6 pounds | — | |
| Caustic soda | — | 8 | |
| Tar oil | 20 gallons | — | |
| Water | 500 gallons | 500 | |
| Powdered Caesalpiniaceous seed | 6 | — | |
| Iron sulphate | — | 200 | |
| Water | 1000 gallons | 1000 | |
| Powdered Caesalpiniaceous seed | 6 pounds | — | |
| Paraffine oil | 48 gallons | — | |
| Caustic soda | — | 8 | |
| Water | 1000 gallons | 200 | 200 gallons |
| Powdered Caesalpiniaceous seed | 6 pounds | — | |
| Paraffine oil | — | 8 | |
| Tobacco extract | — | — | 20 pounds |
| Caustic soda | — | 8 | |
| Water | 1000 gallons | 1000 | |
| Powdered Caesalpiniaceous seed | 6 pounds | — | |
| Caustic soda | — | 4 | |
| Water | 1000 gallons | 1000 | |
| Powdered Caesalpiniaceous seed | 6 pounds | — | |
| Tobacco extract | — | 30 | |

The discovery of the detoxicating qualities of the above described colloidal cellulose also discloses that it may be used in a dusting process, in which the powdered cellulose is mixed with various mineral poisons and the plant growth dusted with this mixture. This dusting process should be used while there is still dew on the foliage, during a rain shower, or immediately after a rain. The presence of the adhesive cellulose secures retention of the insecticide, and in the event of a shower or rain swells the cellulose and prevents the washing away of the insecticide, thus rendering an immediate reapplication unnecessary.

The following table discloses the proportions to be mixed:

Pounds

1. Light alkaline dusting
    Powdered Caesalpiniaceous seed........ 30
    Ammonium sulphate ................. 40
    Lime............................... 17
    Superphosphate..................... 913

2. Medium alkaline dusting
    Powdered Caesalpiniaceous seed........ 45
    Ammonium sulphate ................. 60
    Lime............................... 25
    Superphosphate..................... 870

3. Strong alkaline dusting
    Powdered Caesalpinacea seed.......... 60
    Ammonium sulphate ................. 80
    Lime............................... 34
    Superphosphate..................... 826

4. Lead arsenate dusting
    Lead arsenate powder............... 50
    Powdered Caesalpinacea seed.......... 60
    Superphosphate..................... 890

5. Copper-iron dusting
    Powdered Caesalpinacea seed_____ 50
    Copper sulphate _____ 50
    Iron sulphate_____ 50
    Lime_____ 100
    Borax_____ 29
    Superphosphate_____ 730
6. Copper dusting 1% neutral
    Powdered Caesalpinacea seed_____ 30
    Copper sulphate _____ 100
    Ammonium sulphate_____ 4000
    Lime_____ 200
    Superphosphate_____ 270
7. Copper 2% neutral dusting
    Powdered Caesalpinacea seed_____ 50
    Borax_____ 20
    Copper sulphate _____ 200
    Lime_____ 200
    Superphosphate_____ 530
8. Burgundy mixture 1% dusting
    Powdered Caesalpinacea seed_____ 30
    Copper sulphate _____ 100
    Lime_____ 100
    Borax_____ 10
    Superphosphate_____ 760
9. Calcium arsenate dusting for boll weevil
    Calcium arsenate _____ 900
    Powdered Caesalpinacea seed_____ 50
    Borax_____ 50
10. Sulphur dusting for *Oidium tuckeri* (grapes)
    Flour of sulphur_____ 900
    Powdered Caesalpinacea seed_____ 50
    Lime_____ 50

While I have shown and described the preferred embodiment of my invention, I do not wish to be limited to any of the details disclosed therein, except as defined in the appended claims.

I claim:

1. A detoxicant consisting of finely powdered true carob seed from which the fibrous cellular material thereof has been removed.

2. A detoxicant for mineral poisons consisting of finely powdered true carob seed.

3. A detoxicant for mineral poisons consisting of the finely powdered, dehydrated extract of true carob seed.

4. A detoxicant for mineral poisons consisting of the finely powdered extract of the seed of the caesalpiniaceous tree.

5. A detoxicant for mineral poisons consisting of the finely powdered, dehydrated extract of the seed of the caesalpiniaceous tree, from which the fibrous cellular material thereof has been removed.

6. The method of preparing a detoxicant for mineral poisons comprising grinding true carob seeds to a powder, reducing the powder to a stiff jelly consistency, removing fibrous, woody and cellular extraneous material from the jelly, and dehydrating the jelly to form a dry powder adapted to be mixed with a poisonous spray for rendering the spray non-poisonous to higher animal life.

MARGARET CROSSE.